United States Patent
Langkamp

[11] Patent Number: 5,931,256
[45] Date of Patent: Aug. 3, 1999

[54] DEVICE FOR CONTROLLING A REACTION FORCE USING AN ELECTRIC MOTOR TO PROVIDE A STEERING ASSISTANCE FORCE IN A HYDRAULIC POWER STEERING SYSTEM

[75] Inventor: Bernd Langkamp, Stuttgart, Germany

[73] Assignee: Mercedes-Benz AG, Stuttgart, Germany

[21] Appl. No.: 08/900,511

[22] Filed: Jul. 25, 1997

Related U.S. Application Data

[63] Continuation of application No. 08/495,151, Jun. 27, 1995, abandoned.

[30] Foreign Application Priority Data

Jun. 27, 1994 [DE] Germany .............................. 44 22 386

[51] Int. Cl.⁶ .................................. B62D 5/04; B62D 5/06
[52] U.S. Cl. .......................... 180/422; 180/405; 180/446
[58] Field of Search .................................. 180/400, 417, 180/421, 422, 423, 443, 446, 404, 405, 406, 407

[56] References Cited

U.S. PATENT DOCUMENTS

| | | |
|---|---|---|
| 4,681,181 | 7/1987 | Shimizu .................................. 180/446 |
| 4,743,817 | 5/1988 | Shimizu . |
| 4,751,976 | 6/1988 | Higuchi et al. ......................... 180/446 |
| 5,080,186 | 1/1992 | Elser et al. .............................. 180/407 |
| 5,082,076 | 1/1992 | Oshita et al. ........................... 180/404 |
| 5,273,129 | 12/1993 | Wright et al. ........................... 180/407 |
| 5,511,630 | 4/1996 | Kohata et al. .......................... 180/422 |

FOREIGN PATENT DOCUMENTS

| | | |
|---|---|---|
| 0 580 997 | 2/1994 | European Pat. Off. . |
| 39 08 218 | 9/1989 | Germany . |
| 42 07 719 | 9/1993 | Germany . |
| 62-34852 | 2/1987 | Japan . |
| 63-64869 | 3/1988 | Japan . |
| 63-251368 | 10/1988 | Japan . |
| 1-233169 | 9/1989 | Japan . |
| 6-219291 | 8/1994 | Japan . |
| 2217274 | 10/1989 | United Kingdom . |
| WO 87/06900 | 11/1987 | WIPO . |

*Primary Examiner*—Anne Marie Boehler
*Attorney, Agent, or Firm*—Evenson, McKeown, Edwards & Lenahan, P.L.L.C.

[57] ABSTRACT

A device for the parameter-dependent control of a reaction force at an operating element, in particular a steering wheel of a motor vehicle, of a hydraulic power steering system. In this case, a parameter-dependent additional force is generated by an electric motor in addition to a hydraulically generated servo positioning force.

6 Claims, 2 Drawing Sheets

DEVICE FOR CONTROLLING A REACTION FORCE USING AN ELECTRIC MOTOR TO PROVIDE A STEERING ASSISTANCE FORCE IN A HYDRAULIC POWER STEERING SYSTEM

This application is a continuation of application Ser. No. 08/495,151, filed on Jun. 27, 1995 now abandoned.

BACKGROUND AND SUMMARY OF THE INVENTION

The invention relates to a device for parameter-dependent control of a reaction force at an operating element, e.g. steering wheel, of a hydraulic power steering system and, more particularly, to a device having an electric motor which can be coupled in a driving manner to the operating element, which electric motor is not self-locking.

A hydraulic power steering system of the type described above is known from German Patent document DE 39 08 218 A1. In this known reference, an electric motor serving to generate a restoring torque can be coupled to the steering wheel.

Today's passenger cars are primarily outfitted with hydraulic power steering systems in order to keep the driver applied steering forces on the operating element, i.e., the steering wheel, sufficiently low. This is done, in particular when driving very slowly, for example during maneuvering of the vehicle. Power steering systems of this type have, in the mechanical drive transmission between the steering wheel and the steered wheels of the vehicle, two transmission elements. The two transmission elements are movable relative to one another to a limited extent counter to a spring force. Correspondingly, the two transmission elements carry out greater or lesser relative movements in dependence on the forces transmitted between the steering wheel and the steered wheels. These relative movements control a servo valve which is arranged between a hydraulic pressure source and a relatively pressureless hydraulic reservoir and have essentially two parallel throttle routes. Each throttle route has an input throttle and an output throttle. The input and output throttles of each throttle route are controlled in opposite directions. The two throttle routes are incidentally also controlled in opposite directions.

Additionally, it is a disadvantage that the hydraulic reaction members bring about a specific additional friction which can lead to hysteresis effects and to a poorer return of the steering.

Alternatively to hydraulic power steering systems, electromechanical power steering systems are also known, in which the servo positioning force is generated using an electric motor. However, in view of the servo positioning forces which are generated, in these known systems the vehicle's electrical network must be designed to have increased capability. Additionally, it is a disadvantage with electromechanical systems that accurate controlling of the servo positioning forces, or providing desired magnitudes for the forces, causes control difficulties even in very rapid steering maneuvers. Among other things, this is based on the fact that, in view of the small dimensions of the electric servomotor, high-speed electric motors with a comparatively low torque are generally used. The high-speed electric motors can be connected to the steering via separable drive paths. It is thus possible to allow the electric servomotor to run constantly at a higher speed and to couple it non-positively to the steering system if required.

There is therefore needed a new design for the reaction control of a power steering system.

This need is met according to the present invention in that, in the device of the type described above, the electric motor can be controlled parameter dependently in a manner analogous to a variable which changes in a manner analogous to the actuating force applied at the operating element.

The present invention is based on the general concept of departing from hydraulic control of the reaction forces in dependence on parameters to be determined in a hydraulic power steering system and, instead, providing an additional electric motor which can be controlled in dependence on the parameters.

The advantage achieved according to the present invention is that customary hydraulic power steering systems can be used without parameter-dependent hydraulic control of reaction forces. Servo systems of this type are mass produced and are thus cost-effective. In particular, in a large-series production, both standard vehicles without parameter-dependent control of the reaction forces of the steering system and vehicles with special fittings, in particular with a power steering system with parameter dependently controlled reaction forces, can be equipped with the same hydraulic servo systems. In the case of retrofittings, only the electric motor with its control needs to be additionally provided. In total, significant cost advantages thus result because all the vehicles, in principle, have systems of the same type and only additional systems have to be assembled in the event of special or retrofittings.

According to a preferred embodiment of the present invention, the power steering system has a servo valve (which is known in principle) which is arranged between a hydraulic pressure source and a relatively pressureless hydraulic reservoir. The servo controls a hydraulic servomotor and can be controlled by relative movements between parts of a mechanical drive transmission which couples the operating element or the steering wheel to control members, in particular the steered wheels of the vehicle. In this case, the electric motor is coupled in a driving manner to the operating-element-side part of the parts which are movable relative to one another.

In this manner, it is guaranteed that the forces generated by the electric motor cannot have any direct effect on the servo positioning forces generated by the hydraulic servomotor.

For power steering systems of a motor vehicle, it is generally preferred to design the hydraulic servo system such that it is only capable of generating lower servo positioning forces which are desired at relatively high vehicle speeds. The electric motor is then used to generate an additional assisting force to be used at slower speeds or in particular situations.

In principle, however, it is also possible to design the hydraulic servo system to have such a capability that it is capable of generating the highest servo forces desired during operation, and that, depending on the Parameters, the electric motor generates an additional resistance which can be felt at the operating element.

Other objects, advantages and novel features of the present invention will become apparent from the following detailed description of the invention when considered in conjunction with the accompanying drawings.

DETAILED DESCRIPTION OF THE DRAWINGS

Figure 1:
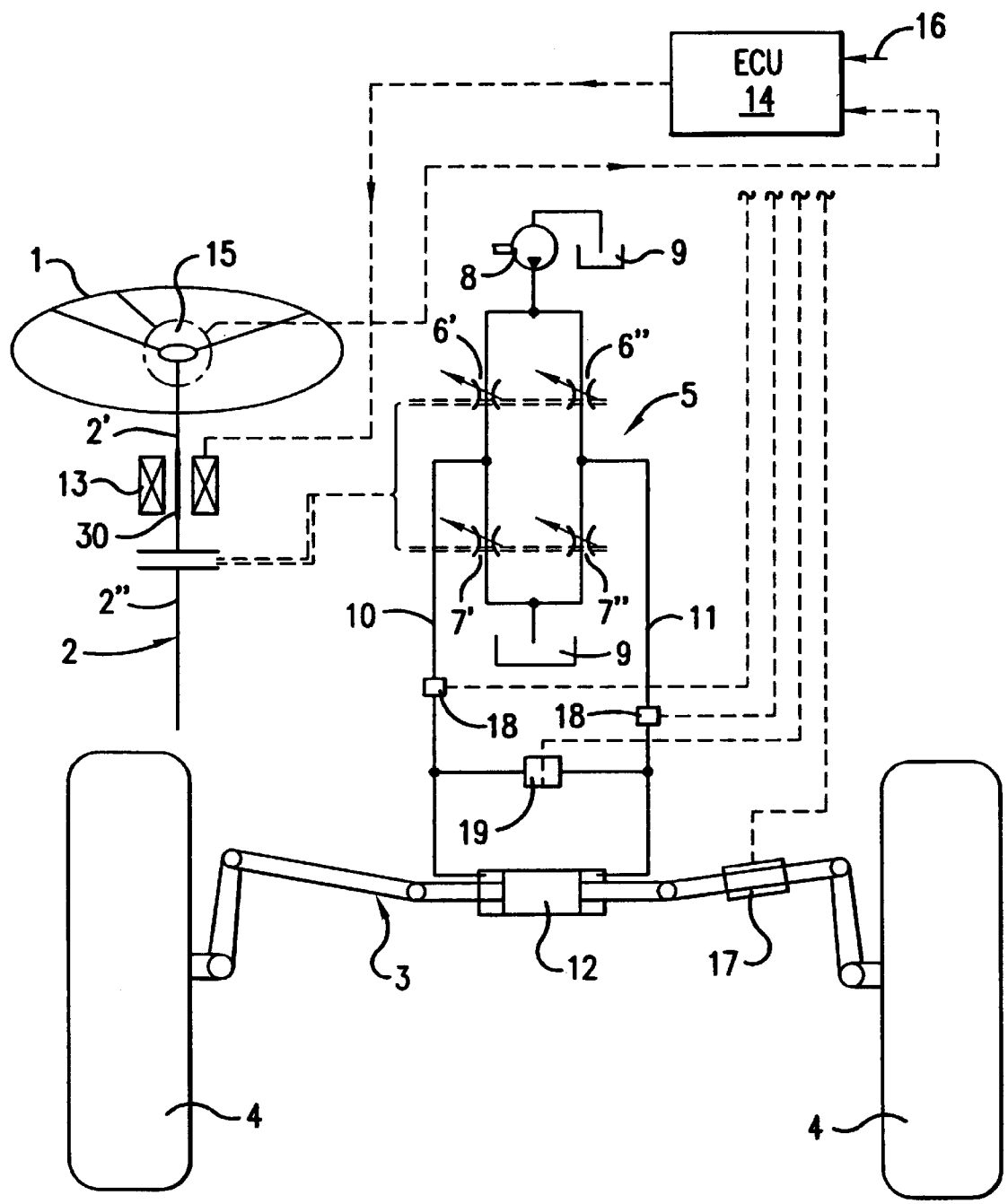
FIG. 1 is a schematic block circuit diagram illustrating a hydraulic power steering system with a device according to the present invention for the parameter-dependent control of the reaction force which can be felt at the steering wheel.

According to FIG. 1, an operating element such as a steering wheel 1 of a motor vehicle is mechanically coupled to the steering linkage 3 of the steered wheels 4 of the vehicle via a mechanical drive transmission in the form of a steering shaft 2 and gear elements (not illustrated) in such a manner that a steering angle of the steered wheels 4 is essentially coupled to a turning movement of the steering wheel 1 and vice versa.

Arranged in the mechanical drive transmission between the steering wheel 1 and the steered wheels 4 are two parts which are movable relative to one another to a limited extent counter to a spring force. In the illustration of FIG. 1, these two parts are the steering-shaft parts 2' and 2". The steering shaft parts 2' and 2" are rotatable relative to one another to a limited extent. When the steering wheel 1 is actuated, these steering-shaft parts 2' and 2" are turned relative to one another counter to the force of a torsion bar (not illustrated) which connects them in a driving manner.

This relative rotation controls a servo valve 5 which, in principle, includes two mutually parallel throttle routes having the input throttles 6' and 6" and the output throttles 7' and 7". These throttle routes are arranged between the delivery side of a hydraulic pump 8 and a relatively pressureless hydraulic reservoir 9 which, in turn, is connected to the suction side of the pump 8.

When the steering-shaft parts 2' and 2" assume a central position relative to one another, the throttles 6' to 7" are opened, specifically in such a way that the input throttles 6' and 6" on the one hand and the output throttles 7' and 7" on the other hand have the same throttle resistances in each case. Hydraulic medium correspondingly flows through both throttle routes, symmetrically with one another. When the steering-shaft parts 2' and 2" are turned relative to one another, one of the input throttles, for example the input throttle 6', is closed relative to the other input throttle, while the output throttle of the other throttle route, in the present example the output throttle 7", is increasingly closed relative to the output throttle of the one throttle route.

Connected between the throttles 6' and 7' and 6" and 7" of the two throttle routes are connection lines 10 and 11 of a hydraulic servomotor 12. The hydraulic servomotor 12 can be designed, for example, as a twin-action hydraulic piston cylinder member. When the two throttle routes are set symmetrically with respect to one another, there is pressure equilibrium between the connection lines 10 and 11. As soon as the throttle routes are adjusted to be asymmetrical relative to one another in the case of relative rotations between the steering-shaft parts 2' and 2", a greater or lesser hydraulic pressure difference occurs at the connection lines 10 and 11. This has the consequence that the servomotor 12 generates a greater or lesser servo positioning force. The servo positioning force is transmitted to the steering linkage 3. The manual force to be applied at the steering wheel 1 is thus reduced for the respective steering maneuver by the driver.

According to the present invention, an electric motor 13 is arranged on the side of the steering wheel 1 on the steering-shaft part 2' (operating-element-side part). The electric motor is not self-locking and is preferably designed such that the steering-shaft part 2', or an equiaxial part firmly connected thereto, forms the rotor of the electric motor 13 whose stator is then arranged in a stationary manner, for example on the vehicle body.

An electrical or electronic control unit 14 is provided as a driver circuit for the electric motor 13. The output side of the control unit 14 is connected to the electric motor 13. The input side of the control unit has a first input which can be connected to a torque sensor 15 arranged between the steering wheel 1 and the steering-shaft part 2'. A further input 16 is connected to a signal generator (not illustrated) for a parameter to be determined, for example the travelling speed of the vehicle.

The electric motor 13 can thus be controlled to generate an additional steering assistance force which reduces the manual forces to be applied at the steering wheel 1 by the driver, specifically in different ways depending on the travelling speed. For example, it is possible not to actuate the electric motor 13 at a high travelling speed so that only the hydraulic servomotor 12 generates a servo positioning force which reduces the manual force to be applied at the steering wheel 1. The lower the travelling speed of the vehicle is, the greater the assisting forces generated by the electric motor 13 can become. As a result, maneuvering, in particular, is made substantially easier, in which the steered wheels 4 of the vehicle have to be adjusted counter to a comparatively high resistance.

Alternatively or in addition to the torque sensor 15, a force measuring member 17, connected to an input of the control unit 14, can be arranged on the steering linkage 3, in the example illustrated on a track rod. Instead or in addition, a signal which represents the pressure difference between the lines 10 and 11 can also be generated, by means of pressure sensors 18 arranged on the connection lines 10 and 11 of the hydraulic servomotor 12 or by means of a differential pressure gauge 19 arranged between said lines 10 and 11. The signal can be passed on to an input of the control unit 14. In this manner, the control unit 14 can control the electric motor 13 in such a way that, in dependence on the travelling speed (or another parameter to be determined), a greater or lesser assisting force is generated. The assisting force changes analogously to the forces acting in the steering linkage 3 and/or analogously to the pressure difference effective at the hydraulic servomotor 12.

Figure 2:
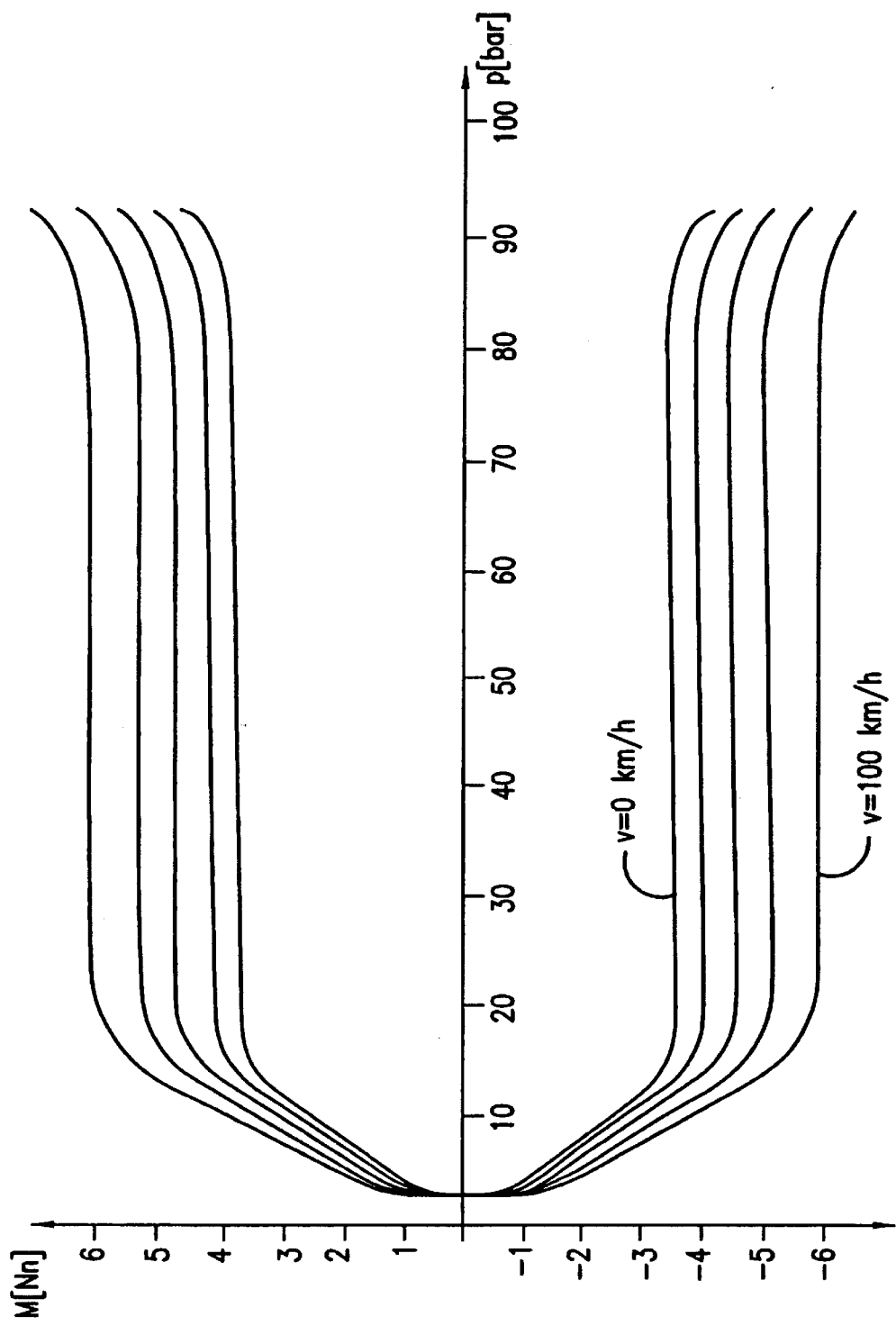
FIG. 2 is a graph diagram which shows the pressure difference effective at the hydraulic servomotor in dependence on the force to be applied at the steering wheel at different travelling speeds.

As a result, conditions then arise as are illustrated in FIG. 2. There the respective differential pressure P prevailing at the hydraulic servomotor 12 is illustrated in dependence on the manual force M to be applied at the steering wheel, specifically for different travelling speeds v which may lie, for example, between 0 km/h and 100 km/h. It can be seen that the steering system operates more smoothly at a low speed or when the vehicle is stationary than at a higher speed.

In the embodiment described, it has been assumed that both the hydraulic servomotor 12 and the electric motor 13 generate forces in each case which reduce the manual forces to be applied at the steering wheel 1. This means the same as saying that, in the relatively stiff state of the steering system, i.e. at a high travelling speed, the electric motor 13 remains ineffective; the electric motor 13 then becomes additionally effective only at low travelling speeds or when the vehicle is stationary.

Instead, however, it is also possible to design the hydraulic servomotor 12 such that smooth steering is already achieved at a low speed or when the vehicle is stationary solely using this servomotor 12. The desired stiffness of the steering at a higher travelling speed can then be achieved in that an assisting force which increases the manual force to be applied at the steering wheel 1 is generated by the electric motor 13.

For safety reasons, the former embodiment is generally preferred in motor vehicles. This is because if the electric motor 13 or the associated control unit 14 should fail, the steering remains stiff at a higher travelling speed. At a low travelling speed and when the vehicle is stationary, only a lack of convenience then has to be tolerated because the steering now also remains stiff in this operating state. In contrast, the case cannot occur that the steering unexpectedly changes from a relatively stiff state into a smooth state.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hydraulic power steering system for a vehicle, comprising:

an operating element used by a driver of the vehicle;

steered wheels operated by said operating element;

a mechanical drive transmission having first and second parts movable relative to one another to a limited extent counter to a spring force, said first and second parts moving relative to one another;

a servo valve arranged between a hydraulic pressure source and a relatively pressureless hydraulic reservoir, said servo valve being controlled by the relative movement of said first and second parts;

a hydraulic servo motor coupled to the steered wheels of the vehicle and being controlled via said servo valve;

an electric motor drivingly coupled to the operating element; and a control unit for controlling said electric motor to provide a force in accordance with input signals received by said control unit from at least one of a force measuring sensor arranged between the hydraulic servo motor and the steered wheels, and pressure sensors arranged to detect a hydraulic pressure difference present at the hydraulic servo motor.

2. The hydraulic power steering system according to claim 1, wherein said first part is an operating-element-side part and said electric motor is drivingly coupled to said operating-element-side part.

3. A steering system according to claim 1, wherein said first and second parts form a steering shaft, a rotor of the electric motor being formed by the first part of the steering shaft arranged adjacent the operating element relative to the second part.

4. A steering system according to claim 1, wherein the electric motor generates an auxiliary force acting to control the steered wheels in a same direction as a servo positioning force of the hydraulic servo motor.

5. A steering system according to claim 1, wherein said electric motor generates an additional force counteracting a servo positioning force of the hydraulic servomotor.

6. A steering system according to claim 1, further comprising a further sensor detecting a manual force parameter of said operating element, said further sensor being coupled to said control unit.

* * * * *